April 24, 1962

R. E. FEARON 3,031,571

APPARATUS AND METHOD FOR CONDITIONING AND
ANALYZING EARTH COMPONENTS

Filed May 21, 1956

INVENTOR.
ROBERT E. FEARON
BY
Philip H. Sheridan
ATTORNEY

April 24, 1962

R. E. FEARON 3,031,571

APPARATUS AND METHOD FOR CONDITIONING AND
ANALYZING EARTH COMPONENTS

Filed May 21, 1956

INVENTOR.
ROBERT E. FEARON
BY
Philip H. Sheridan
ATTORNEY

United States Patent Office 3,031,571
Patented Apr. 24, 1962

3,031,571
APPARATUS AND METHOD FOR CONDITIONING AND ANALYZING EARTH COMPONENTS
Robert E. Fearon, Tulsa, Okla., assignor to Well Completions, Inc., Denver, Colo., a corporation of Colorado
Filed May 21, 1956, Ser. No. 586,172
23 Claims. (Cl. 250—52)

This invention relates generally to apparatus for and methods of analyzing substratum substances and earth components, particularly oil well cuttings. In its broadest aspects, provisions are made for conditioning such earth components so that they may be analyzed and thereafter carrying out the analysis in such a manner that the results are correlated with the depth within the earth from which the substances were obtained, the analysis method and apparatus including circuitry and instrumentation to excite and measure identifying radiations emitted by any desired elements contained in the components.

In the past and presently, various technics have been employed to analyze earth constituents, such as oil field cuttings and/or rocks and the like. For example, microscopic analysis by counting and estimating the number of particles of each type of mineral, or counting certain types of microfossils, has been found useful. There also has been employed to define the crystal specie present X-ray diffraction analysis. Further, among prior art technics is the procedure of dissolving a sample of rock, after a carbonate fusion, and chemically analyzing the resulting water solution.

Such typical prior art methods, in general, have not fully served the needs of those engaged in boring into the earth for oil and minerals. All batchwise procedures have been suffered because of the constant need for the presence of skilled personnel on which the analysis depends and also the necessity for very prompt and continuous results is not met in the batchwise procedures. Furthermore, the need for automatic correlation of the results obtained with depth is not served by methods involving the analysis of discrete samples, one at a time. For example, the analyst can easily commit the error of getting the samples out of order or he can make a mistake in entering the depth at which they were recovered from the bore. There is, in addition, a need for estimation of the amount of elements such as silicon, aluminum, calcium, titanium, iron, etc., which are among the common elements of the earth and each of these requires a separate chemical procedure, rendering a total analysis of a sample complicated, time consuming and costly by methods of the prior art. The above are merely typical of the defects and difficulties of prior art apparatus and methods.

A principal object of the present invention is to provide an apparatus and method overcoming the deficiencies of the past and providing accurate and relatively simple means for analyzing the common elements of earth components.

Yet another object of the invention is to provide an improved apparatus and method for conditioning earth components for analysis of earth elements.

Also an object of the invention is in the continuous passage of earth components through an evacuated or low vapor pressure space to properly condition same for analysis.

A further object is to provide apparatus and methods of conditioning for analysis earth components, such as oil cuttings, by continuously introducing to and removing cutting samples from an enclosed space containing a vacuum or a controlled atmosphere, as desired, without appreciably impairing the vacuum or contaminating the controlled atmosphere.

Still another object of the invention is to provide apparatus and methods for delivering earth samples promptly and continuously into the path of an electron beam after they are received in the stream of returning liquid or gas used to sweep the cuttings out of the earth.

Another object is to provide an earth element analysis by bombarding sample components with a stream of electrons and observing the resulting radiation in the form of secondary emission.

An object of the invention resides in the provision of improved circuitry and instrumentation to handle the analysis by secondary emission of desired elements contained in the earth components.

A further object is to provide improved apparatus and methods for continuously analyzing earth components, such as cuttings recovered from a well bore and for presenting the results of the analysis automatically in correlation with depth from which they were obtained within the bore.

It is an object of this invention to provide for continuously analyzing and recording the percentage of any desired element present in earth components, such as cuttings, and for graphically representing the results of the desired analysis in correlation with depth of the boring at the time the cuttings are received for analysis.

Other advantages and objects of the invention will become apparent upon considering the following detailed description in conjunction with the drawings wherein like numerals represents similar parts throughout and wherein.

Figure 1:
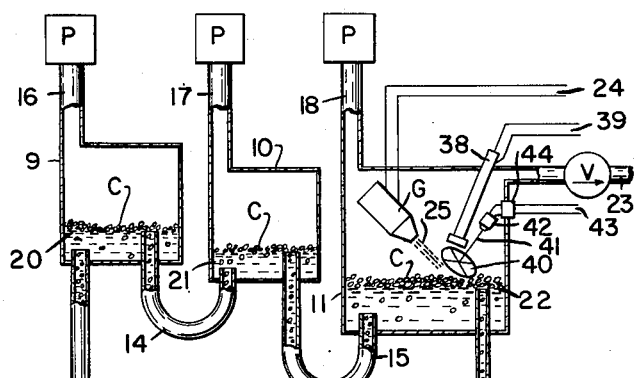
FIGURE 1 is a schematic view illustrating the earth components being received from a bore, introduced into a vacuum or rarified atmosphere, bombarded by electrons and then secondary emission detected, and finally returned to atmospheric pressure.
Figure 1:
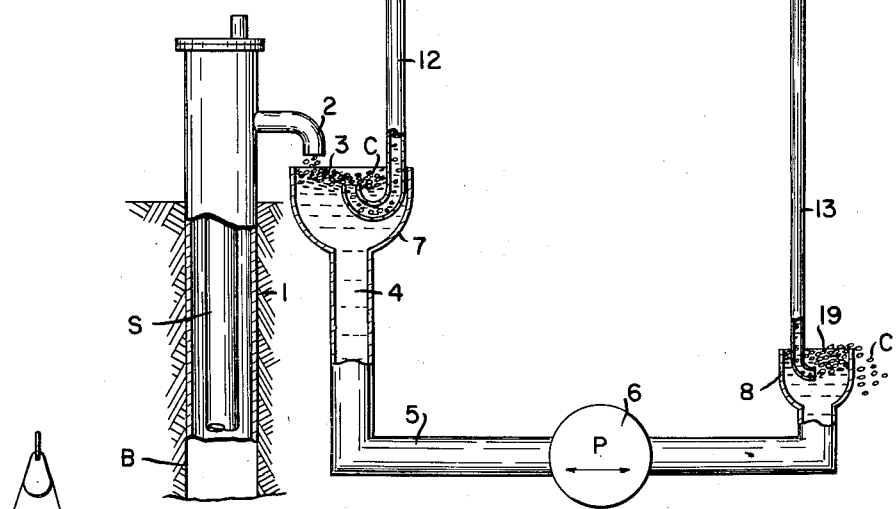

Bearing in mind that the drawings are illustratory and not to be construed as limiting, the first aspect of the invention will now be discussed in detail, namely conditioning typical earth components so that they may be analyzed. B indicates an earth bore at the top of which is a casing 1 and through the latter extends the hollow drill pipe or stem S to perform drilling operations in a well known manner. The drill stem would be provided with a rotary bit at its lower end, said bit being driven by suitable power at the surface, either by rotating the stem or otherwise. There is provided suitable structure for sealing off the drill stem from the casing and 2 is a discharge pipe by which the circulating medium employed during drilling can be discharged away from the drilling rig. The present invention is particularly designed for conditioning and analyzing cuttings and the like carried from the earth by gas as the circulating fluid in contrast to a so-called liquid fluid known as drilling "mud." Therefore, hereinafter the reference will be made to circulating gas as the drilling fluid (air or other gases including hydrocarbon gases or a mixture thereof), but it is to be understood that drilling "mud" may be employed by merely inserting a separator (including washing and filtering means) for the cuttings at the outlet of discharge pipe 2.

Cuttings C received at the well head are permitted to fall from the discharge pipe or chute 2 onto the surface 3 of a reservoir of mercury 4 terminating in a supply line generally represented by the numeral 5. Mercury has been found to be particularly satisfactory as the carrier medium for the cuttings as it does not chemically attack the cuttings or cause corrosion. Also, mercury is a high density liquid at ordinary temperatures. However, other fusible high density metal may be used as the carrier, such as gallium or Wood's metal, such metals having a low vapor pressure which is important in maintaining a vacuum. Line 5 is connected in a fluid circuit with a suitable circulating medium, such as the centrifugal pump 6, and has at one end thereof a reservoir 7 positioned vertically above reservoir 8 at the other end of line 5. Associated with reservoirs 7 and 8 are conduits 12 and 13, respectively, and these conduits are connected with suitable receptacles 9, 10 and 11 through trap conduits 14 and 15. The mercury carrying cuttings C is circulated through the chambers or receptacles 9, 10 and 11 and, as should be apparent, the difference in height between reservoirs 7 and 8 controls and determines the rate at which it is desired to circulate the fluid. Each of the chambers 9, 10 and 11 are maintained under low pressure by connecting conduits 16, 17 and 18 of each to suitable vacuum pumps P. Of course, the length of tube or conduit 12 cannot exceed the limit required to create a perfect vacuum in space 9 and this in turn also depends on the density of the liquid carrier 4.

Assuming drilling cuttings C are discharged onto surface 3 and the closed circuit is in operation, the cuttings, due to the circuit arrangement, are caused to be entrained, as illustrated, and rise to the surface 20. In the low pressure space 9 the cuttings largely lose air absorbed from the earth and elsewhere and are entrained by mercury rapidly flowing through trap 14 from whence they are caused to float on surface 21 of space 10, where they are further degassed. The cuttings, now substantially freed of air, are transported by flowing mercury through trap 15 into evacuated space 11 where they float on surface 22. At this time the cuttings are in condition to be analyzed, as will be hereinafter explained, it being understood that the number of spaces 9, 10 and 11 shown is merely illustrative and not limiting, the number being dictated by the amount of conditioning necessary as the cuttings in the final chamber 11 should be as free of air and gas as possible to avoid interference with the analysis which starts in the final space or chamber 11. It should be mentioned that although degassing is the primary function of the vacuums created, any remaining volatile liquid vapors, such as water and hydrocarbons, are also removed.

The cuttings entrained with mercury in space 11 pass downwardly in tube 13 and accumulate on surface 19 (exposed to atmospheric pressures) until they fall off and are thus disposed of and of course reference samples may be saved from the thus disposed cuttings. The aforesaid method and apparatus for conditioning cuttings to be analyzed essentially, it will be appreciated, includes a fluid system for continuously introducing to and removing from an evacuated space cuttings of the earth components. However, as stated, it is necessary in order to maintain a proper vacuum to employ as the carrier for cuttings a metal of relatively high density and low vapor pressure which is fusible at practical operating temperatures.

As will be explained, within chamber 11, the electron bombardment of the cuttings C takes place and the thickness of the layer of cuttings C floating on the mercury surface 22 is not too important as the electron bombardment is only over a limited area. However, in actuality the liquid metal will not be bombarded most of the time as such will be covered by the floating cuttings on its surface. Continuous and uniform coverage of the mercury surface with a cutting float is desirable in order to maintain an amount of secondary emission which will be characterized by the amount of the element being analyzed in the cuttings rather than the amount of cuttings present.

Instead of being completely evacuated, space 11 may contain introduced gases at low pressures. This may be done by shortening tube 13, extending trap 15 to accommodate any desired difference of level between surfaces 19, 22 and 21 and admitting a suitable gas, such as hydrogen or helium, through a normally closed suitable valve V provided in supply line 23. The cuttings having been substantially degassed in evacuated chambers 9 and 10, they do not contaminate the gas thus introduced.

Atoms of elements extending from sodium up through manganese have especially non-penetrating X-rays corresponding with their K series monochromatic emissions. The monochromatic X-ray fluorescent emissions of these elements are specifically indicative of the presence of such elements, and in general conform to the same physical laws as do monochromatic X-ray emissions from heavy elements. Because light elements are abundant in oil well cuttings, it is especially desired for purpose of analysis to have available means of observing their soft or non-penetrating monochromatic X-rays. The non-penetrating character of such rays necessitates the use of a vacuum or suitable atmosphere (such as hydrogen or helium) in which to make the observation for air absorbs the monochromatic X-rays of the elements below manganese in atomic number. As indicated, the observation or detection of X-ray emission in the embodiment shown is to take place in chamber 11 and it should be apparent that cuttings C received from hopper 2 are properly conditioned by the use of carrier 4 and the degassing means alone or in conjunction with the gas supply. This method and apparatus for conditioning is important in order to obtain proper and true observations from electron bombardment of the cuttings and is believed to involve invention apart from the overall detection apparatus and method. Because of the defects caused by air, it is necessary to employ one of the two alternatives, namely, introducing a sample by means of a suitable carrier into a vacuum and continuously removing it therefrom or introducing a sample by means of a suitable carrier into a gas filled space which absorbs the radiations of the sample to a less extent than does air and continuously removing it therefrom. Furthermore, air, if not evacuated from space 11, would burn out the filament or electron gun G, to be described; and, as stated, air would interfere with the electron flow and secondary emission of the soft rays.

Now considering the detection and observation apparatus and method of this invention, it will be assumed that cuttings C within chamber 11 are in proper condition to be analyzed by observation of their radiation under electron bombardment or other suitable primary radiation. Schematically shown in FIGURE 1 is a suitable cathode-ray gun G electrically energized by energy supplied to wires 24. Sodium that may be contained in the cuttings C is one of the elements desired to be detected and the monochromatic X-rays of sodium, for the hardest K line of X-rays emitted by sodium, cannot be excited by bombarding electrons having an energy less than that produced by a potential difference of 1069 volts accelerating them. If there is applied to gun G energy exceeding 1069 volts, then the cathode ray 25 will have sufficient energy to excite secondary emission from the element sodium as well as all elements below sodium on the periodic table. The theory of my operation is based on thus applying to the sample C, when detecting for sodium, energy exceeding 1069 volts intermittently.

Figure 2:
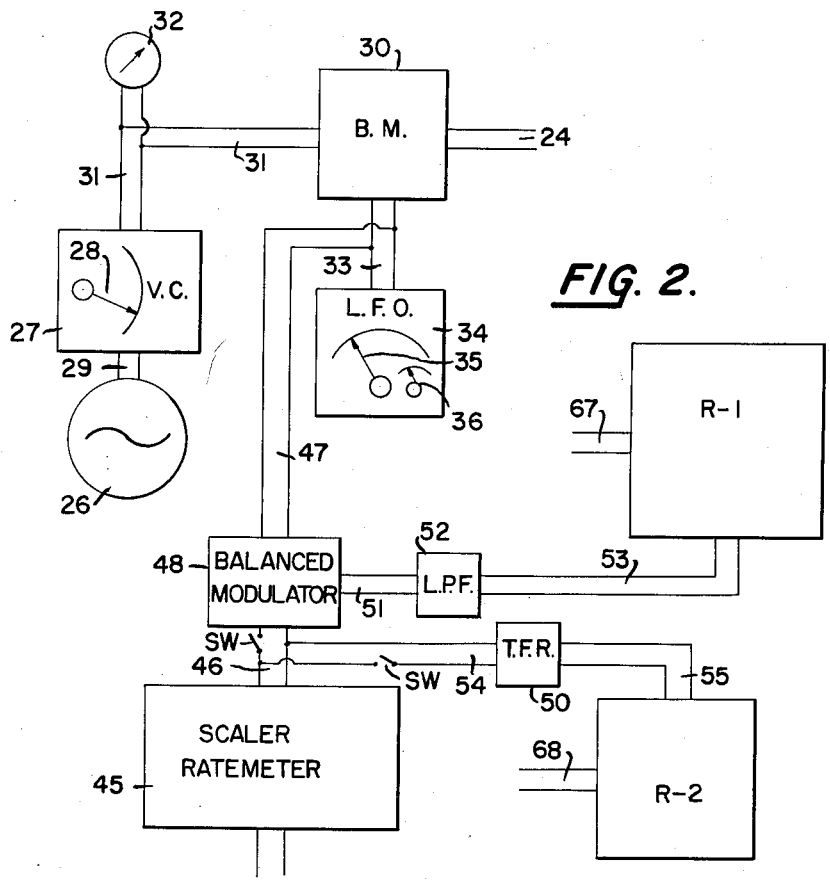
FIGURE 2 is a diagrammatic view of the circuitry and instrumentation employed in the analysis, with the parts being illustrated in block diagram form as they are well known and commercially available.

Bearing the above in mind and considering the circuit schematic of FIGURE 2, many of the electrical elements are represented by block diagrams as they constitute well known and commercially available circuitry components and equipment. Numeral 26 represents a suitable voltage source, either A.C. or D.C., which is controlled manually by controller 27 which may be any well known variable voltage device such as a Powerstat, Transtat, Varitran or Variac, having an adjustable voltage controlling arm 28. The voltage output is fed to controller 27 over lines 29 and the desired voltage issues therefrom to the input of unit 30 over wires 31, there being connected in parallel in lines 31 a voltage meter 32. Unit 30 is a balanced modulator which also receives pulses delivered over lines 33 from an adjustable low frequency oscillator 34 having amplitude adjusting means 35 and frequency adjusting means 36. The modulator 30 should have high voltage and good power rating and, of course, the output of unit 30 is delivered to the gun G.

To understand the operation of elements 26, 27, 30 and 35, let us assume that sample C in chamber 11 is to be excited to observe sodium. Arm 28 is adjusted so that meter 32 reads 1069 volts and this will be peak volts assuming A.C., which is preferred, is used. The effect of modulator 30 and oscillator 34 is to make the value delivered to wires 24 half the time exceed 1069 volts and half the time to fail to reach this value. If the oscillator 34 is adjusted to provide, for example, an input to the unit 30 over wires 33 comprising an oscillating source having a frequency of five cycles per second, then there may be a one-fifth second of delivery on wires 24 which exceeds 1069 volts by the amount of amplitude set by means 35 and a one-fifth second delivery of less voltage, per cycle of the oscillator 34. In other words, the amplitude of the five cycle voltage superimposed on the 1069 voltage controls the modulated peak or percentage of modulation and the upper and lower limits of voltage variation supplied to gun G. This in turn is determined by the voltage at which secondary emission of the adjacent upper element on the periodic table takes place, such as 1299 in the case of manganese. Therefore, in detecting sodium the amplitude of the modulated peak should be kept below 1299, which is the voltage critical of secondary emission of the next desired element to be detected. Bearing in mind what has been said concerning the electrons of beam 25 exceeding the value of 1069 volts to excite the ray by which sodium contained in the floating sample C is recognized, then it is only during the period when the delivery exceeds 1069 volts, assuming sodium is present, that sodium will emit its monochromatic 1069 volt X-ray. The other one-half of each cycle of this ray will not be emitted.

The secondary emission radiated from sample C must, of course, be suitably detected to make the proper observation and preferably this detection is correlated with bore depth from which the sample was obtained. Numeral 38 of FIGURE 1 represents a radiation detection element which is capable of delivering electrical signals indicative of electromagnetic radiation or secondary emission originating in the sample 22 as a result of bombardment from gun G, and these electrical signals are transmitted over wires 39. Element 38 is preferably a well known spherical anode Geiger counter constructed with an extremely thin radiation transmitting window on the end thereof furthest removed from the terminals.

There may be interposed between the sample 22 and element 38 a quadrantly sectored wheel 40, the sectors of which pass closely in front of the radiation sensitive region of element 38. The quadrants of wheel 40 are balanced Ross filters, as described in Physical Review, volume 28, page 425 et seq. Wheel 40 is detachably keyed for rotation to shaft 41 of an electrical motor 42 which is energized by stable frequency alternating current power supplied to it by wires 43. Incidentally, wires 43 and element 38 pass through airtight insulators in the walls of chamber 11, as illustrated at 44. By stable frequency with reference to motor 42 is meant a low frequency which will drive the sectors of wheel 40 at a frequency of apposition that will fall within the pass band of a tuned filter rectifier TFR 50, shown in FIGURE 2, and which will be hereinafter described more in detail. For example, 42 could be a Selsyn motor synchronized with an external control such as a photograph motor, but in actual practice the filter 50 is chosen and then steps are taken to properly synchronize motor 42. Wheel 40 is utilized only in connection with an alternative embodiment, as will be explained.

Now considering FIGURE 2 more in detail and assuming wheel 40 is removed from shaft 41, filter 50 is disconnected and motor 42 disconnected, the signal received from detector 38 as a result of sodium secondary emission is delivered over wires 39 to an electrical unit 45 which preferably is a scaler-ratemeter, familiar in the art of nuclear measurement, when element 38 is chosen as a Geiger counter. The output of the unit 45, on wires 46, is a direct current proportional to the intensity of radiation received from sample 22 at 38. Unit 45 is a well known piece of equipment manufactured by North American Philips Co., Inc., and identified in the trade as Model PW 4010. This latter unit may be operated by the use of a procedure as set forth in the booklet "Directions for Use, Philips Pocket Monitor PW4010" and bearing the code numbers 66 902 07.3–10 and 15/1054. This instrument contains, among other things, the count rate meter (complete with power supply) of a Geiger counter system.

As mentioned, the output over wires 46 is a direct current proportional to the intensity of radiation of the sample 22 and again assuming sodium is present in the sample and being detected, then the output from scaler 45 will be a fluctuating signal, the size of the fluctuations being dependent upon the amount of sodium present in the sample. These fluctuations are synchronized with the electric waves received over wires 47 from oscillator 34 and there is interposed between wires 46 and 47 a balanced modulator 48. The effect of the modulator 48, which is of the well known type, is to synchronously rectify the fluctuating signal from the scaler 45, converting it into direct current proportional to the amplitude of the fluctuations. This synchronous rectification provides better results, but is not essential as the output of unit 45 could be rectified non-synchronously also. However, synchronous rectification in the modulator 48 or an equivalent thereof, such as a resonant vibrator, is preferred as synchronous rectification better eliminates random electrical disturbances in the system.

The modulator or synchronous rectifier differs from an ordinary rectifier in that it rectifies only the signals which are in phase with some applied reference signal, such as the modulated reference signal applied over wires 24. Such synchronous rectifiers require a reference signal of the same frequency and phase as the signal to be detected. Numeral 52 represents a well known low pass filter which received the rectified signal over wires 51 and merely serves to smooth out the ripple in the rectified signal from whence the signals, representative of sodium secondary emission, are delivered to a recorder R–1 over wires 53. This latter action will be more fully described, but for the present it will be understood that recorder R–1 receives the signals.

In using the second embodiment, i.e. when wheel 40 is positioned as in FIGURE 1, the signal from the output of scaler 45 travels over wires 54 (unit 48 is disconnected by operating one of the switches SW) to tuned filter rectifier unit 50 and then through wires 55 to recorder R–2. Unit 50 is a well known piece of equipment which functions by tuning as distinguished from unit 48 which functions by synchronous rectification. Both units 48 and 50 exclude undesirable frequencies or noise.

Both recorders R–1 and R–2 are of known type and commercially available and preferably are of the double pen or stylus type and the signals from 52 operate one pen of R–1 while the signals from 50 operate one pen of R–2. The recorders R–1 and R–2 provide two separate means for observing the analyzed sample radiation and may take the form of galvanometric or potentiometric recorders such as those identified in the trade as "Micromax" or "Speedomax" wherein D.C. is balanced against potential delivered by a standard cell through a slide wire using a servo-mechanism to automatically adjust a slide wire. Actually, the current to the recorders R–1 or R–2 is proportional to the concentration of a given element in the sample C.

Figure 4:
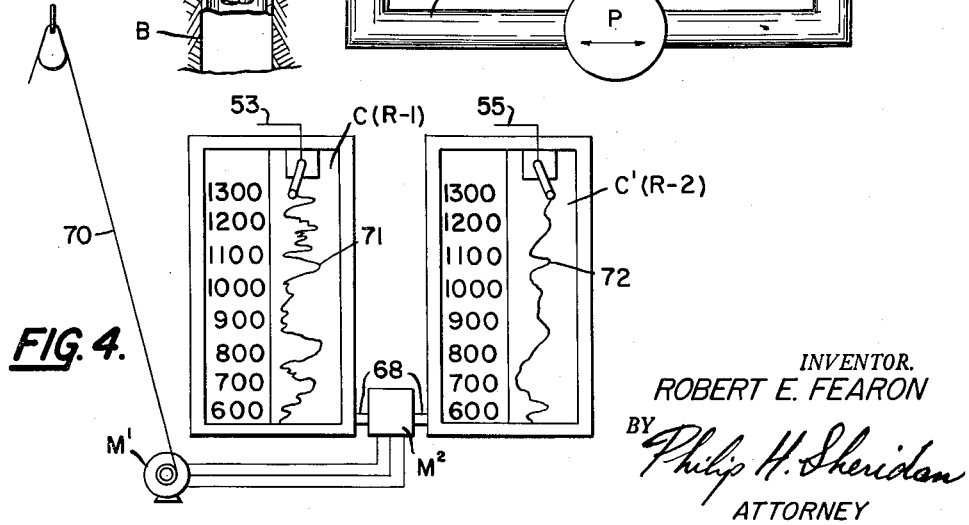
FIGURE 4 is a schematic view illustrating an alternative manner of correlating the analysis with depth.
Figure 3:
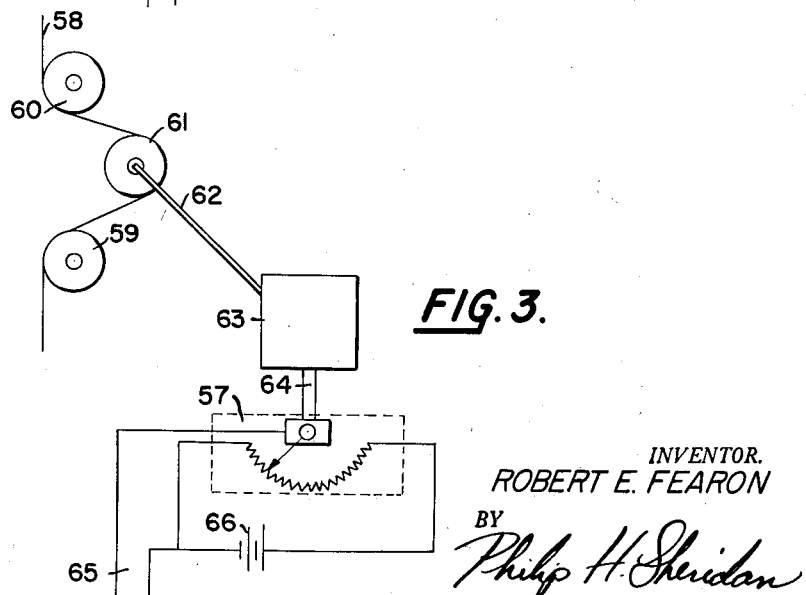
FIGURE 3 is a schematic view illustrating one manner of correlating the analysis with depth.

The information recorded by R–1 and R–2 relative to sample radiation should preferably be correlated with depth and this may be done by many well known arrangements such as that shown in FIGURE 3 or 4. The arrangement of FIGURE 3 is constructed so that auxiliary signals correlated with depth from where the samples 22 are obtained are delivered to operate the second pens of each recorder R–1 and R–2 over wires 54 and 55, thereby resulting in the analytical information being recorded by the first pens of each to be automatically and continuously correlated with depth. The auxiliary signals may be obtained from a heliopt 57 mechanically driven by movement of the hoisting cable 58 passing from the drawworks over idlers 59 and 60 and measuring pulley 61, the shaft 62 of which extends to gear box 63 and, through it, the longitudinal movement of cable 58 causes the shaft 64 of helipot 57 to turn. The output delivered indirectly to wires 65 from constant voltage battery 66 is related to the turning of the shaft 63 and hence to the movement of cable 58. Thus, the output of wires 65 may be delivered to wires 67 or 68 (through selective switch means of any suitable type) of FIGURE 2 to actuate the second pen of either recorder R–1 or R–2, to enable data received by them to be correlated with depth, through being correlated with movement of cable 58 which in turn is correlated with depth. Of course, there will have to be taken into account the duration of time required for the cuttings to travel from the bore to surface 22, but this may be determined reasonably accurately by various technics.

Another suitable arrangement for correlating with depth is shown in FIGURE 4 wherein C is the chart sheet of R–1 and C' is the chart sheet of R–2. Line 70 is connected for movement with the traveling block and controls a Selsyn motor $M^1$ which will be operated only while penetration is taking place, that is, only when the stem S of FIGURE 1 moves downwardly. $M^1$ is connected to a companion Selsyn motor $M^2$ by suitable electric conductors and this latter motor will be connected by shafts 68 to drive the two charts C and C' in accordance with penetration of the drilling bit. In this instance there is no necessity to operate the second pens of each recorder, but again the time for travel of the cuttings to surface 22 must be accounted for.

As pointed out, the detection apparatus shown includes two types of operations, one involving the use of R–1, units 48 and 52 and not the wheel 40 or unit 50 and the other involving wheel 40 and unit 50 and not units 48 and 52. To follow through with the first type of operation and again assuming sodium is present in the sample C under test, the proper bombardment is set, namely 1069 volts properly modulated, and thus a fluctuating signal indicative of secondary emission is delivered from the output of scaler 45 to the modulator 48 whereupon it is synchronized with the oscillating source over lines 47. The D.C. output from the modulator 48 is proportional to the ripple in the D.C. output of scaler 45 and travels through filter 52 to operate one of the pens of R–1 which in turn provides a marking on chart C representative of the amount of sodium in the sample. A typical marking is shown at 71 in FIGURE 4 and, of course, this would be correlated with depth as explained. The marking 71 would appear regardless of whether the depth indicating structure of FIGURES 3 or 4 was employed.

In using the second type of operation, the beam 25 is set as in the first operation or, if it is desired, the oscillating source 34 may be eliminated and instead arm 28 set to supply a higher voltage than 1069 volts, say 1200 volts. The tuned filter rectifier 50 should be designed to transmit waves at a frequency of 2F, where F is the frequency of synchronous motor 42 driving a quadrant of Ross filters. The Ross filters of wheel 40 are chosen to have the alternate segments made of elements, or compounds of elements, of atomic number one greater and of atomic number one less than the atomic number of the sodium being analyzed. In use each Ross filter will block radiations for all elements or components thereof below a certain element that comprises the filter. The sodium radiation detected is in the form of a fluctuating voltage and a function of the speed of motor 42 as described above. This fluctuating voltage passes in to scaler 45 which provides an amplified voltage (D.C. with ripple) suitable for tuned rectification by unit 50 which in turn delivers to R–2 a D.C. voltage proportional to the ripple. In other words, the tuned filter rectifier 50 passes only the current of the frequency corresponding to the fluctuations in the sodium radiation produced by rotating wheel 40 and this is represented by markings 72 on C–2.

In selecting filters for wheel 40 when detecting, you choose filters that selectively absorb and transmit the K series secondary emission. The filters are alternately mounted on wheel 40 so that as the wheel rotates, they will transmit radiation including and excluding radiation proportional to the element present and being detected, such as sodium. This produces in the detector 38 a fluctuating D.C. voltage, the amplitude of which is proportional to the amount of sodium.

To conduct a test for the element magnesium using the method involving the sectored wheel 40 of FIGURE 1, the sectors are constructed of material rich in sodium and rich in aluminum, other contents of these sectors being chosen to be as similar as possible. The sodium rich sector will selectively transmit radiations emitted monochromatically by magnesium and elements higher on the periodic table, and the aluminum rich sector will selectively absorb the rays of magnesium and elements of lower atomic number. If the sample floating on the surface 22 be rich in magnesium, the detector 38 will be alternately shielded from and exposed to the monochromatic rays emitted as the magnesium is excited. In this method I excite the magnesium with electrons or weak gamma rays in excess of 1299 electron volts (the amount needed to excite magnesium) at all times. The alternate shielding and exposing of the detector 38 from magnesium emitted monochromatic X-rays produces a fluctuating output on wires 46 from the scaler, the amplitude of the fluctuations being a measure of the amount of magnesium present in the sample. These fluctuations are selectively observed and represented on recorder R–2. The tuned filter rectifier is chosen to be resonant at the frequency of apposition of the sectors of wheel 40 and excludes oscillations occurring at other frequencies.

To set the above method to observe aluminum, a new sector wheel 40 is required, comprising sectors rich in magnesium, and in silicon. Instead of substituting a succession of sector wheels 40 may be used enabling testing samples for many elements concurrently or, if desired, there may be provided different types of sectors at various radii from center of the axis of element 40, and a plurality of detectors like 38 each at a particular radius. Each detector will sense a particular element, corresponding with its sector system. The fluctuating outputs of the various detectors so provided may be observed in a fixed succession, if desired, and thus a single recorder will present data of a complete analysis of the sample, testing for elements in a regular sequence.

Testing for elements other than sodium has been described in connection with operation two and it is to be understood that operation one may be easily altered to accomplish the same result. For example, in using operation one and testing for sulphur it is only necessary to set arm 28 so that the meter 32 will read 2468 volts.

It will be observed that the detector 38 received excited secondary emission or fluorescent X-rays from the sample in a direction substantially reversed with respect to the direction of propagation of the incident, exciting beam. This is expedient as the monochromatic X-rays are emitted equally in all directions, but other emissions are stronger forward, or in the equatorial plane.

Among the variations of my method, alpha rays may be used to generate the X-rays of light elements. Polonium is a suitable alpha ray emitter. Alpha rays may be conveniently shuttered with a septum, to observe a blank of the electrical system at intervals.

Instead of gun G there may be substituted therefor a betatron (Kerst & Serber, General Electric) or a canalized gamma ray or beta ray radioactive source. In such operations units and parts 26, 28, 30, 34, 48 and 52 and recorder R–1 are de-energized or disconnected and R–2 is used to record the data. The wheel 40 is the element discriminating device and iron 55 is a suitable low energy emitter, such source and suitable Ross filters permitting elements 11 to 24 of the periodic table to be surveyed.

Concerning the balanced modulators 30 and 48, the following constitute references indicating that they, including their circuitry, are well known and may take several forms:

(1) Copper Oxide modulators in Carrier Telephone Systems by R. S. Caruthers, Bell Telephone Labs. The Bell System Technical Journal, vol. XVIII, pp. 315–337, April 1939.

(2) Balanced Modulators, Radio Engineering, p. 415, by Frederick E. Termon, second edition, McGraw-Hill Book Co.

(3) Single Side-Bond for the Radio Amateur, The American Radio Relay League, Inc. Publication, pp. 24–33, inclusive.

Referring again to FIGURE 1, it will be noted that the cuttings fragments descending from the delivery chute 2 are represented as floating on the mercury contained in the bowl or reservoir 7. In the tubing 12, the finely subdivided cuttings are represented as being stirred or temporarily emulsified with the mercury. Again in the chambers 9, 10 and 11 the cuttings C are represented as very promptly separating from, and floating upon, the surface of the mercury in the said spaces. Also in the tubing 14 and 15 the cuttings are represented as being stirred or emulsified in the mercury temporarily. Investigation has disclosed that there may be a practical conflict between the prompt separation of the cuttings on the one hand and the temporary emulsification on the other, since the characteristics of a liquid which favor the one phenomenon disfavor the other. Mercury is a liquid which strongly disfavors emulsification and strongly favors prompt separation. The characteristics of mercury which make this so are (1) the mercury is very much more dense than the cuttings, (2) the mercury has an extremely high surface tension, (3) mercury has a low interfacial tension for the interface between mercury and cuttings, and (4) as a consequence of the foregoing, the temporary emulsions of cuttings in mercury are unstable and the mercury does not wet the cuttings.

The necessary and sufficient condition for the maintenance of a dispersed state of these emulsions may take the form of rapid stirring and turbulence. The condition of rapid stirring and turbulence is, in general, maintained by motion of the liquid at a high velocity in the various connections 12, 14, 15 and 13 of FIGURE 1. The probable necessity for very rapid motion creates a possibility of partial failure of the system which will result when, in any of the connecting tubes 12, 14 or 15, there occurs a clustering and adhesion of groups of particles of the cuttings against the tubing walls. Because of the fact that the cutting separate upward, it has been discovered that there is a tendency for cuttings to rise against the top surface of the bend illustrated in tube 14 and again in tube 15. Such clusters when formed, may impede the flow of liquid, decrease the amount of turbulence, and favor the formation of further clusters and masses of adherent cuttings separated from the mercury in a position to block the flow of that liquid. Accordingly therefore, the horizontal sections of the tube 12 (the elbow at the bottom of the tube 12), the horizontal section of tube 14 and of tube 15 are places where the type of failure just described may occur. Because of the properties of mercury, with respect to the maintenance of the temporary emulsion, it may be desirable to take certain precautions against such possible failure.

A satisfactory technique for protecting the system against a failure of the type described resides in the use of suitable and well known stirring means in the necessary parts of the circuit, such as a turbine consisting of alternate sets of stationary and moving blades. The turbine is deliberately chosen as an illustration as it combines the function of a pump and a vigorous stirring means, operating the horizontal sections of the tubes which are carrying mercury emulsified with cuttings.

The vertical sections of the tubings 12, 14, 15 and 13 do not present the same problem, since they have no horizontal surface against which the cuttings can separate. Moreover, the addition of extra circulating force furnished by the turbines, for example, may be used to make the motion in the vertical sections shown in FIGURE 1 very rapid, which is an added protection against a possible failure. It is to be understood, however, that FIGURE 1 may be used in the preferred form illustrated, if the clogging does not in any given case exist or prove undesirable. The points in the FIGURE 1 system which might be improved by the addition of stirring means are the horizontal portion of the elbow of tube 12, the bottom portion of tube 14 and tube 15 and any other horizontal sections, if any. For example, tube 14, if so modified, will actually consist of two absolutely vertical sections and one absolutely horizontal section comprising the turbine.

As was noted in describing mercury, the characteristics of a liquid suitable for this system are high density, rapid separation of the cuttings from the liquid, inability of the liquid to wet the cuttings, so that it exposes them clean for the test in vessel 11, ability to temporarily emulsify the cuttings sufficiently well to permit the operation of the system, and low enough in viscosity to permit a rapid flow of the liquid, and further fluid characteristics to permit a sufficient rapidity of flow of the temporary emulsion of the cuttings and the liquid. As has been noted in the foregoing description, there are other liquids than mercury which, to a greater or lesser extent, fulfill these requirements. In addition to the ones already named, the following are examples of others that have been found to have merit: (a) symmetrical tetrabromoethane (density 3.0, non-wetting with respect to most materials), (b) certain silicone oils, and (c) carefully arranged emulsions in which particles of heavy substances such as metallic lead are deliberately emulsified in liquids which are non-wetting in respect to the cuttings. This combination of characteristics can be obtained by suitable surface treatment of the metallic lead particles (or other density increasing material) which may be employed with the non-wetting liquid. It is apparent that for each liquid given, the height of the tubes 12 and 13 must vary accordingly, inversely as the density of the liquid chosen. For example, in the case of the symmetrical tetrabromoethane, the height of the tube 13 will have to be approximately 12' instead of the more or less 30" which will be the case if mercury is employed. Of course, the tetrabromoethane cannot be employed to test all the cuttings if the cuttings contain very many minerals that are more dense than it is. On the other hand, the employment of such a liquid can serve, if it is desired for any reason to analyze the less dense fraction of the cuttings and refrain from analyzing the denser portion of the cuttings in vessel 11. In such a case, the analysis is subject to a further control by the operator, who can, by choosing the density of the liquid employed in lieu of mercury, deliberately analyze any desired density fraction of the cutings, selecting the fraction by the gravitational separation afforded by the particular liquid chosen.

Alpha ray bombardment, previously mentioned, differs from other bombardments in the way of its employment, favors the elements of low atomic number in respect to excitation of K X-rays, and in general does not excite the universal background of radiation to the same extent as does an electron bombardment. Further, the alpha ray exciter is employed in combination with the Ross filter arrangement and preferably the vacuum may be dispensed with in favor of an atmosphere of hydrogen or helium. The distance between the alpha ray source and the sample must at all times be maintained substantially less than the range of the alpha rays emitted by the source in hydrogen or helium, whichever is used. Reference is made to the publication in Zeitschrift f. Physik, vol. 52, pages 466 to 484, 1928, by W. Bothe and H. Franz which describes the physical science relating to generating X-rays by alpha particles.

It is to be understood that the various apparatuses and methods disclosed constitute merely examples of the preferred embodiments and that further modifications are entirely possible without departing from the fundamental principles of the invention. Thus, being aware of these possible modifications as well as uses, I desire it to be clear that the scope of the invention is not to be limited except in accordance with the terms of the appended claims and equivalents thereof.

What is claimed is:

1. A method of analyzing solid granular-like particles, particularly earth components, to determine the amount of an element contained therein comprising the steps of entraining the particles in a liquid of high density and having non-wetting characteristics, introducing the thus entrained particles into a space from which air has been evacuated, subjecting the entrained particles in said space to bombardment with selected radiation of sufficient energy to excite secondary emission of the element being analyzed in the form of X-rays, detecting any secondary emission resulting from the bombardment, and developing from the emission, thus detected, electrical signals representative of the presence and the amount of the element in said particles.

2. A method as defined in claim 1 wherein the liquid is a high density metal and the radiation consists of electrons of a predetermined voltage.

3. A method as defined in claim 1 including the step of recording an indication of the electrical signals developed.

4. A method as defined in claim 1 including the steps of conveying the particles into said space from the earth, recording a permanent indication of the electrical signals developed in correlation with the depth in the earth from which said particles were obtained.

5. A method as defined in claim 1 including the step of observing the emission through a rotating sectored wheel, alternate sectors of which selectively absorb and transmit the K series fluorescent X-rays from the bombarded element and wherein the electrical signals developed are proportional to the intensity of the rays of the element being analyzed.

6. A method as defined in claim 1 wherein the radiation consists of electrons, the voltage of which is a modulated wave with the peak thereof within the upper limit of voltage for exciting secondary emission of the element.

7. A method of analyzing solid granular-like particles to determine the amount of an element contained therein comprising the steps of entraining the particles in a liquid of high density and having the non-wetting characteristics, introducing said particles into a space evacuated of air, subjecting the particles in said space to bombardment alternately with two selected energies of bombarding particle radiation, one of which has energy per particle insufficient to excite the fluorescent X radiation of the K series for the element and one of which exceeds the per particle energy necessary to so excite the element, detecting any secondary emission resulting from the respective bombardments and developing an electrical signal representative of the difference in intensity of the secondary radiation emitted by the two bombardments.

8. A method of analyzing solid granular-like substances to determine the amount of an element contained therein comprising the steps of entraining the particles in a liquid of high density and having non-wetting characteristics, passing said substances through a space evacuated of air, subjecting the substances to bombardment with a radiation of sufficient energy to excite fluorescent X-rays therefrom, passing X-rays resulting from the bombardment through a rotating sectored wheel, alternate sectors of which selectively absorb and selectively transmit the K series fluorescent X-rays from the element, detecting the X-rays transmitted through said wheel and developing an electrical signal proportional to the intensity of the rays of the element being analyzed, and determining the amount of an element contained in the substance as a function of the fluctuations in said signal occurring at the frequency of rotation of the wheel.

9. Apparatus for analyzing solid granular-like substances to determine the amount of an element contained therein comprising carrier means for entraining said substances comprising a high density, non-wetting liquid metal, means for bombarding the thus entrained substances with selected radiation of sufficient energy to excite secondary emission in the form of X-rays of the element being analyzed and means for detecting any secondary emission resulting from the bombardment and developing from the emission electrical signals representative of the amount of the element present in the substances.

10. Apparatus as defined in claim 9 including at least one chamber within which the substances are positioned and means to substantially completely evacuate the chamber of air.

11. Apparatus as defined in claim 10 including means for recording a permanent indication of the electrical signals.

12. Apparatus as defined in claim 11 including means to correlate with said recording the source from which said substances were obtained.

13. Apparatus for analyzing solid granular-like earth substances to determine the amount of an element contained therein comprising carrier means entraining said substances comprising a high density, non-wetting liquid metal, for positioning the thus entrained substances in a space evacuated of air, electrical means for subjecting the substances in said space to bombardment alternately with two selected energies of bombarding particle radiation, one of which has energy per particle insufficient to excite the fluorescent radiation of the K series for the element and one of which exceeds the per particle energy necessary to so excite the element, and means for producing an electrical signal representing the difference in intensity of the secondary radiation emitted by the two bombardments.

14. Apparatus as defined in claim 13 including means for recording an indication of the electrical signal.

15. Apparatus as defined in claim 14 including means for correlating with said recording the depth in the earth from which the substances were obtained.

16. Apparatus for analyzing solid granular-like earth substances to determine the amount of an element contained therein comprising carrier means entraining said substances comprising a high density, non-wetting liquid metal, for positioning the thus entrained substances in a space evacuated of air, means for subjecting the substances to bombardment with a selected radiation suitable to excite fluorescent X-rays therefrom, a sectored wheel having filter sectors alternately arranged to selectively absorb and selectively transmit the K series fluorescent rays from the element, means to rotate the wheel at a predetermined frequency, means associated with the wheel for developing an electrical signal proportional to the intensity of the rays passing therethrough, and means for detecting fluctuations in said signal occurring at said frequency.

17. Apparatus as defined in claim 16 including means for recording an indication of said fluctuations.

18. Apparatus as defined in claim 17 including means for correlating with said recording the depth in the earth from which the substances were obtained.

19. A method of analyzing solid granular-like substances to determine the amount of an element contained therein comprising the steps of subjecting the substances to bombardment with alpha ray radiation of sufficient energy to excite secondary emission rays of the element, detecting the excited rays through a rotating sectored wheel, alternate sectors of which selectively absorb and transmit rays from the element, developing an electrical signal proportional to the intensity of the rays of the element passing through the sectored wheel, and selectively observing fluctuations in said signal occurring at the frequency of rotation of the wheel.

20. A method of analyzing solid granular-like substances to determine the amount of a selected element contained therein which comprises, introducing the substances into a controlled environment from which air has been removed, bombarding the substances with electrons at an energy level to excite secondary emission in the substances in the form of characteristic X-rays of the selected element, and detecting the characteristic X-rays emitted for the purpose of analysis.

21. A method of analyzing solid granular-like substances of low atomic number to determine the amount of a selected element contained therein which comprises introducing the substances into an evacuated space, bombarding the substances with electrons at a predetermined energy level sufficient to excite secondary emission in the form of characteristic X-rays of the selected element, and detecting the characteristic X-rays emitted for the purpose of analysis.

22. A method of analyzing solid granular-like substances of low atomic number to determine the amount of a selected element contained therein which comprises, introducing the substances into a controlled environment from which the air has been removed, bombarding the substances with electrons of sufficient energy to excite secondary emission in the form of characteristic X-rays, and observing the characteristic X-rays emitted in a direction substantially opposite to the direction of incidence of the exciting electrons.

23. In apparatus for conditioning solid granular-like substances for analyzing the amount of an element contained therein, comprising a closed system including at least one chamber, carrier means for the substances to be conditioned being composed of a high density metal in liquid state, means to evacuate air from said chamber, means communicating with said chamber to circulate said carrier means within which the substances are entrained through said chamber, and means for bombarding the substances while in said chamber with selected radiation of sufficient energy to excite secondary emission in the form of X-rays of the element being analyzed, together with detecting means for developing from the emission electrical signals representative of the amount of the element present in said substances.

References Cited in the file of this patent

UNITED STATES PATENTS

| | | |
|---|---|---|
| 2,206,922 | Smith | July 9, 1940 |
| 2,330,721 | Leverett | Sept. 28, 1943 |
| 2,453,458 | Reed et al. | Nov. 8, 1948 |
| 2,487,797 | Friedman et al. | Nov. 15, 1949 |
| 2,528,955 | Hayward | Nov. 7, 1950 |
| 2,547,015 | Kirbride | Apr. 3, 1951 |
| 2,551,449 | Menke | May 1, 1951 |
| 2,635,192 | Cordovi | Apr. 14, 1953 |
| 2,659,046 | Arps | Nov. 10, 1953 |
| 2,704,704 | Ogorzaly | Mar. 22, 1955 |
| 2,744,199 | Juterbock et al. | May 1, 1956 |
| 2,761,975 | Weisz | Sept. 4, 1956 |
| 2,783,385 | Wytzes | Feb. 26, 1957 |
| 2,844,730 | Tandler et al. | July 22, 1958 |
| 2,908,821 | Schmacher | Oct. 13, 1959 |
| 2,928,944 | Reiffel | Mar. 15, 1960 |

OTHER REFERENCES

X-Ray Photography by Means of Fluorescent X-Radiation, by Elmer Dershem in Journal of the Optical Society of America, vol. 29, No. 2, Feb. 1939, pp. 41, 42.

Geiger Counter Speeds Analysis of Alloy Steels, Product Engineering, page 154, Nov. 1949.

Clark: Applied X-rays, published by McGraw-Hill, Inc., New York, 1955, page 147.